(12) United States Patent
Sakai (10) Patent No.: US 10,915,000 B2
(45) Date of Patent: Feb. 9, 2021

(54) VARIABLE FOCAL LENGTH LENS CONTROL METHOD AND VARIABLE FOCAL LENGTH LENS DEVICE

(71) Applicant: MITUTOYO CORPORATION, Kanagawa (JP)

(72) Inventor: Hiroshi Sakai, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 156 days.

(21) Appl. No.: 16/291,357

(22) Filed: Mar. 4, 2019

(65) Prior Publication Data

US 2019/0271898 A1 Sep. 5, 2019

(30) Foreign Application Priority Data

Mar. 5, 2018 (JP) ................. 2018-038676

(51) Int. Cl.
*G02F 1/29* (2006.01)

(52) U.S. Cl.
CPC .......... *G02F 1/29* (2013.01); *G02F 2001/294* (2013.01)

(58) Field of Classification Search
CPC ........... G02F 1/29; G02F 1/292; B82Y 20/00; G02B 26/005; G02B 30/27
USPC ....................................................... 359/315
See application file for complete search history.

(56) References Cited

U.S. PATENT DOCUMENTS

| | | |
|---|---|---|
| 2010/0177376 A1 | 7/2010 | Arnold et al. |
| 2018/0007343 A1* | 1/2018 | Send ................... H04N 13/271 |
| 2018/0180773 A1 | 6/2018 | Usami et al. |
| 2018/0180774 A1 | 6/2018 | Nagahama et al. |
| 2018/0314033 A1 | 11/2018 | Sakai et al. |
| 2018/0314041 A1 | 11/2018 | Igasaki et al. |
| 2018/0314042 A1 | 11/2018 | Igasaki et al. |
| 2019/0121056 A1 | 4/2019 | Nagahama et al. |

OTHER PUBLICATIONS

U.S. Appl. No. 16/415,190 to Hiroshi Sakai et al., which was filed May 17, 2019.
U.S. Appl. No. 16/415,306 to Yutaka Watanabe et al., which was filed May 17, 2019.
U.S. Appl. No. 16/414,148 to Hiroshi Sakai et al., which was filed May 16, 2019.

* cited by examiner

*Primary Examiner* — Mohammed A Hasan
(74) *Attorney, Agent, or Firm* — Greenblum & Bernstein, P.L.C.

(57) ABSTRACT

In a variable focal length lens control method, a plurality of candidate planes are defined at different focal lengths of a variable focal length lens, an image of a measurable object is detected by an image detector at each of the candidate planes, contrast in each of the detected images is calculated, any of the candidate planes is selected based on the contrast, and a focal length of the selected candidate plane is defined for a lens controller.

17 Claims, 8 Drawing Sheets

VARIABLE FOCAL LENGTH LENS CONTROL METHOD AND VARIABLE FOCAL LENGTH LENS DEVICE

CROSS-REFERENCE TO RELATED APPLICATIONS

The present application claims priority under 35 U.S.C. § 119 of Japanese Application No. 2018-038676, filed on Mar. 5, 2018, the disclosure of which is expressly incorporated by reference herein in its entirety.

BACKGROUND OF THE INVENTION

1. Field of the Invention

The present invention relates to a variable focal length lens control method and a variable focal length lens device.

2. Description of Related Art

As a variable focal length lens device, a device has been developed that uses a liquid lens system (hereafter also referred to simply as "lens system") operating on a principle described by the specification of U.S. Published Patent Application No. 2010/0177376, for example. The liquid lens system is formed by immersing in a transparent liquid a hollow cylindrical oscillating member formed of a piezoelectric material. In the liquid lens system, when AC voltage is applied to an inner circumferential surface and an outer circumferential surface of the oscillating member, the oscillating member expands and contracts in a thickness direction and causes the liquid on an inner side of the oscillating member to oscillate. By adjusting the frequency of the applied voltage in response to the natural frequency of the liquid, a standing wave of concentric circles is formed in the liquid and concentric circular regions having different refractive indexes are formed centered on a center axis line of the oscillating member. In this state, when light transits along the center axis line of the oscillating member, the light travels along a path that either disperses or converges the light in accordance with the refractive index of each concentric circular region.

The liquid lens system described above and an objective lens for bringing the light into focus (for example, an ordinary convex lens or a group of lenses) are arranged on the same optical axis to configure a variable focal length lens device. The liquid lens system is packaged as a liquid lens apparatus and is incorporated into the variable focal length lens device. When parallel light strikes the ordinary objective lens, light passing through the lens comes into focus at a focal position that lies at a predetermined focal length. In contrast, when parallel light strikes the lens system arranged coaxially with the objective lens, the light is either dispersed or converged by the lens system and the light passing through the objective lens comes into focus at a position offset either farther away or closer than the original (state with no lens system) focal position. Accordingly, in the variable focal length lens device, a drive signal (AC voltage of a frequency that generates a standing wave in the interior liquid) that is input to the lens system is applied, and by increasing or decreasing the amplitude of the drive signal, the focal position of the variable focal length lens device can be controlled as desired within a set range (a predetermined amount of change by which the lens system can increase or decrease the focal position, with the focal length of the objective lens as a reference).

In the variable focal length lens device, a sinusoidal AC signal is used as an exemplary drive signal that is input to the lens system. When such a drive signal is input, the focal length (focal position) of the variable focal length lens device changes sinusoidally. In this case, when the amplitude of the drive signal is 0, the light transiting the lens system is not refracted and the focal length of the variable focal length lens device is the focal length of the objective lens. When the amplitude of the drive signal is at a positive or negative peak, the light transiting the lens system is maximally refracted and the focal length of the variable focal length lens device is in a state having the greatest change from the focal length of the objective lens. When an image is obtained using a variable focal length lens device of this kind, a light emission signal is output to provide pulse illumination, synchronized with the phase of the sine wave of the drive signal. Accordingly, by providing pulse illumination in a state that is in focus at a predetermined focal length from among the sinusoidally changing focal lengths, an image of a measured object (measurable object or object to be measured) at that focal length is detected. Pulse illumination is performed at a plurality of phases that make up one period, and when image detection is performed in accordance with each phase, images at a plurality of focal lengths can be obtained simultaneously.

In the variable focal length lens device described above, a user defines the point in time (phase of the drive signal) at which pulse illumination is provided. In other words, the user defines the focal length for image detection. Specifically, when a focal length equivalent to a position on a surface of the measured object is defined for a controller in the lens system, pulse illumination and image detection can be performed while focused on the same surface and a crisp image of the surface can be detected. When the surface of the measured object features a plurality of stepped surfaces of different heights, an image that includes a surface image of each stepped surface can be detected by defining a plurality of focal lengths that correspond to the surface of each stepped surface. However, conventionally, in order for the user to acquire the focal length corresponding to a detection location on the measured object, a provisional measurement of the measured object is carried out ahead of time and the user visually checks the resulting image to acquire the focal length for an image that is in focus. Alternatively, for example, the user performs a shape measurement of the measured object and a relative measurement position is converted to a phase of the variable focal length lens to acquire the focal length. Therefore, in order for the user to define the focal length, complicated preparatory work is needed to acquire a focal length that focuses in response to a measured object, and improvements on the above have been sought.

SUMMARY OF THE INVENTION

An advantage of the present invention lies in providing a variable focal length lens control method and a variable focal length lens device that are capable of automatically defining a focal length that is responsive to a measured object.

A variable focal length lens control method according to the present invention makes use of a variable focal length lens device that includes a variable focal length lens capable of modifying a focal length, an image detector capable of detecting an image of a measured object through the variable focal length lens, and a lens controller that causes the image detector to detect an image when the variable focal length lens is at a predetermined focal length. In the method, a plurality of candidate planes are defined at different focal lengths of the variable focal length lens, an image of the measured object is detected by the image detector at each of the candidate planes, contrast in each of the detected images is calculated, any of the candidate planes is selected based on the contrast, and a focal length of the selected candidate plane is defined for the lens controller.

In the present invention, a value calculated by dividing a brightness value for a maximum brightness pixel in the image by the brightness value for a minimum brightness pixel (that is, a contrast ratio), for example, can be used as the contrast of the image. Also, in order to perform image detection when at the predetermined focal length, pulse illumination can be used that is synchronized with the focal length of the variable focal length lens and emits light at a predetermined point in time.

In the present invention, the plurality of candidate planes having different focal lengths within a focal range of the variable focal length lens are defined and image detection of the measured object is carried out at each of the candidate planes. For example, at a specific candidate plane, when the focal length aligns with a partial surface of the measured object, that surface is captured in a focused state and the contrast is increased in an image region corresponding to that surface. Meanwhile, a different surface deviates from the focal length and is captured in a blurry state, and the contrast is decreased in an image region corresponding to that surface. In other words, when the contrasts in the detected images at each of the candidate planes are respectively calculated, the contrast increases for an image that has a portion that is in focus and decreases for one that does not. Therefore, by making a selection from among the plurality of candidate planes based on the contrast, a candidate plane that is in focus at the surface of the measured object can be identified. Then, the focal length of the identified candidate plane can be defined for the lens controller. Accordingly, automatic definition of a focal length that is responsive to the measured object can be provided without requiring cumbersome preparatory work by the user.

In the variable focal length lens control method according to the present invention, preferably, a number of image planes is designated ahead of time, and also ranks are assigned to the candidate planes based on the detected contrast, and candidate planes for the number of image planes are selected beginning at the top of the ranks.

In the present invention, so long as the number of image planes is designated ahead of time, a candidate plane that is at a focus position of the measured object can be selected automatically based on the assigned rank, which is based on the contrast, without further operation by the user. Furthermore, in order to select any of the plurality of candidate planes for which the contrast is calculated, for example, a list can also be displayed having the plurality of candidate planes sorted in order of contrast, and a user can judge the contrast of each candidate plane and select any of the candidate planes. Also, all of the candidate planes having a contrast equal to or greater than a reference value may be selected. Moreover, when the number of image planes is defined as 1, a candidate plane that is in focus is automatically selected and an image can be obtained that is similar to what is commonly referred to as auto-focus.

In the variable focal length lens control method according to the present invention, preferably, a candidate plane interval is designated ahead of time, and the candidate plane is defined for each focal length for each candidate plane interval within a variable focal range of the variable focal length lens.

In the present invention, so long as the candidate plane interval is designated, the plurality of candidate planes can be defined within the variable focal range of the variable focal length lens, and a cumbersome conventional operation in which the different focal lengths are individually designated as the candidate planes can be eliminated. The user may define the candidate plane interval in consideration of a shape of the measured object, or the like. For example, when the measured object has a simple shape with only three stepped surfaces, processing time can be compressed by setting the candidate plane interval to be large and setting a number of candidate planes to be low. Also, when the measured object has complex unevenness, the candidate plane interval is preferably set to be small. A number of the candidate planes defined within the variable focal range of the variable focal length lens may also be designated as the plurality of candidate planes, for example.

In the variable focal length lens control method according to the present invention, preferably, a target region is designated ahead of time on a portion of the measured object, and definition of the candidate planes through to calculation of the contrasts is performed for the target region.

In the present invention, by designating the target region on a portion of the measured object ahead of time, processing can be limited to the target region, and processing for definition of the candidate planes through to selection can be accelerated. A region of interest on the measured object, such as a region where image measurement is to be performed, can be appropriately used as the target region. The target region can be selected by, for example, an operation of displaying the measured object on a screen and selecting a region on the screen.

In the variable focal length lens control method according to the present invention, preferably, the variable focal length lens includes a liquid lens system, in which the refractive index changes in response to an input drive signal, and an objective lens, which is disposed on the same optical axis as the liquid lens system.

In the present invention, basic imaging can be achieved with the objective lens, and the focal length can be modified with the liquid lens system. By using the liquid lens system, no mechanism is needed for changing the focal length and the configuration of the device can be simplified. Also, the liquid lens system can change the focal length periodically and at high speed, and a multi-plane image that is focused on a plurality of focal planes (equivalent to a composite image of a plurality of images having different focal lengths) can also be readily obtained.

A variable focal length lens device according to the present invention includes a variable focal length lens capable of modifying a focal length, an image detector capable of detecting an image of a measured object through the variable focal length lens, a lens controller that causes the image detector to detect an image when the variable focal length lens is at a predetermined focal length, and a lens operator that defines for the lens controller a focal length where the image detector detects the image. The lens operator includes a candidate plane definer that defines a plurality of candidate planes at different focal lengths of the variable focal length lens, detects an image of the measured object with the image detector at each of the candidate planes, and calculates contrast in each of the detected images; and a focal length definer that selects any of the candidate planes based on the contrast, and defines for the lens controller a focal length of the selected candidate plane. With the present invention, beneficial effects in line with the description for the variable focal length lens control method according to the present invention can be achieved.

According to the present invention, a variable focal length lens control method and a variable focal length lens device can be provided that are capable of automatically defining a focal length that is responsive to a measured object.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, an embodiment of the present invention is described with reference to the drawings.

Variable Focal Length Lens Device 1

Figure 1:
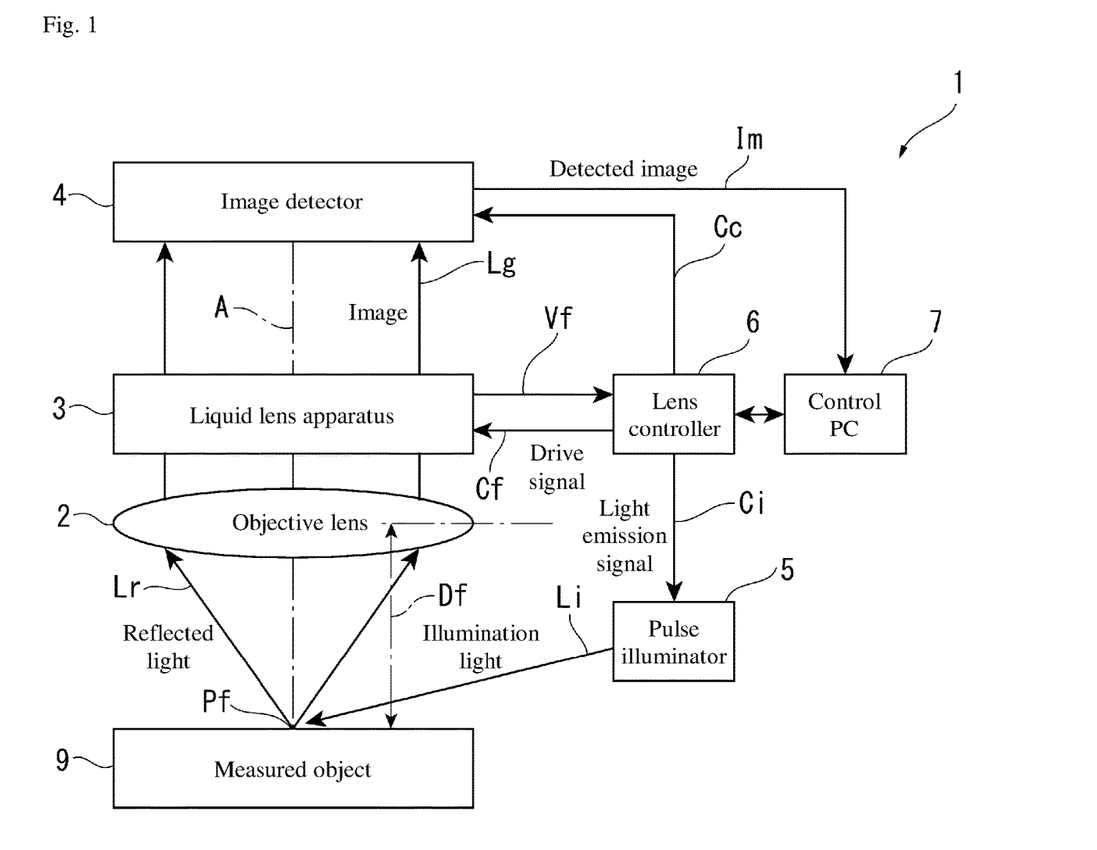
FIG. 1 is a schematic view of an embodiment of the present invention.

In FIG. 1, a variable focal length lens device 1 detects an image of a surface of a measured object 9 while varying a focal length. In order to do this, the variable focal length lens device 1 is provided with an objective lens 2 and a liquid lens apparatus 3 that are arranged coaxially on the optical axis A that intersects with the surface; an image detector 4 that detects an image of the measured object 9 obtained through the objective lens 2 and the liquid lens apparatus 3; and a pulse illuminator 5 that provides pulse illumination of the surface of the measured object 9. In the variable focal length lens device 1, a variable focal length lens is configured by the objective lens 2 and the liquid lens apparatus 3.

Moreover, the variable focal length lens device 1 is provided with a lens controller 6 (lens control processor) that controls the operation of the liquid lens apparatus 3 and the pulse illuminator 5, and a control PC 7 for operating the lens controller 6. The control PC 7 is configured by a personal computer that is known in the art, and expected functionality is achieved by running predetermined control software. The control PC 7 also includes functionality that imports and processes an image from the image detector 4.

The objective lens 2 is configured by a known convex lens. The image detector 4 is configured by a known charge coupled device (CCD) image sensor or some other form of camera, for example, and can output to the control PC 7 an incident image Lg as a detected image Im having a predetermined signal form. The pulse illuminator 5 is configured by a light emitting element such as a light emitting diode (LED), and when a light emission signal Ci is input from the lens controller 6, illumination light Li can be emitted for a predetermined amount of time and pulse illumination of the surface of the measured object 9 can be provided. The illumination light Li is reflected by the surface of the measured object 9, and reflected light Lr from the surface of the measured object 9 passes through the objective lens 2 and the liquid lens apparatus 3 to form the image Lg.

The liquid lens apparatus 3 is configured with a liquid lens system on an interior thereof, and a refractive index of the liquid lens apparatus 3 changes in response to a drive signal Cf input from the lens controller 6. The drive signal Cf is a sinusoidal AC signal of a frequency that generates a standing wave in the liquid lens apparatus 3. In the variable focal length lens device 1, a focal length Df to a focal position Pf can be changed as desired by changing the refractive index of the liquid lens apparatus 3 with the focal length of the objective lens 2 as a reference.

Liquid Lens Apparatus 3

Figure 2:
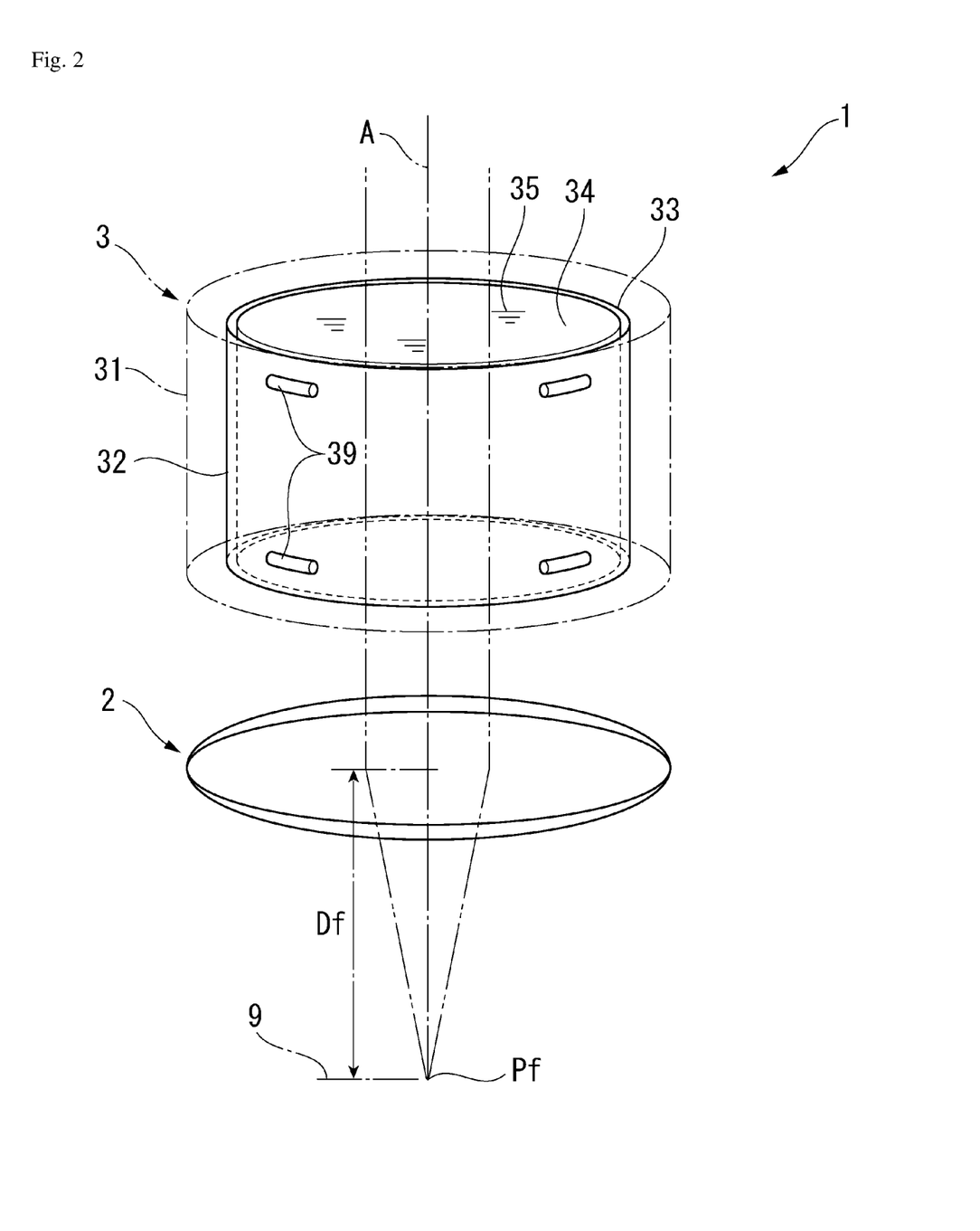
FIG. 2 is a schematic view illustrating a configuration of a liquid lens system according to the embodiment.

In FIG. 2, the liquid lens apparatus 3 includes a hollow cylindrical case 31, and a hollow cylindrical oscillating member 32 is installed on an interior of the case 31. The oscillating member 32 is supported by spacers 39 made of an elastomer that are disposed between an outer circumferential surface 33 of the oscillating member 32 and an inner circumferential surface of the case 31. The oscillating member 32 is a member where a piezoelectric material is formed in a hollow cylindrical shape. The oscillating member 32 oscillates in a thickness direction due to an AC voltage of the drive signal Cf being applied between the outer circumferential surface 33 and the inner circumferential surface 34. The interior of the case 31 is filled with a highly transparent liquid 35, the entire oscillating member 32 is immersed in the liquid 35, and an inner side of the hollow cylindrical oscillating member 32 is filled with the liquid 35. The AC voltage of the drive signal Cf is adjusted to a frequency that generates a standing wave in the liquid 35 on the inner side of the oscillating member 32.

Figure 3A:
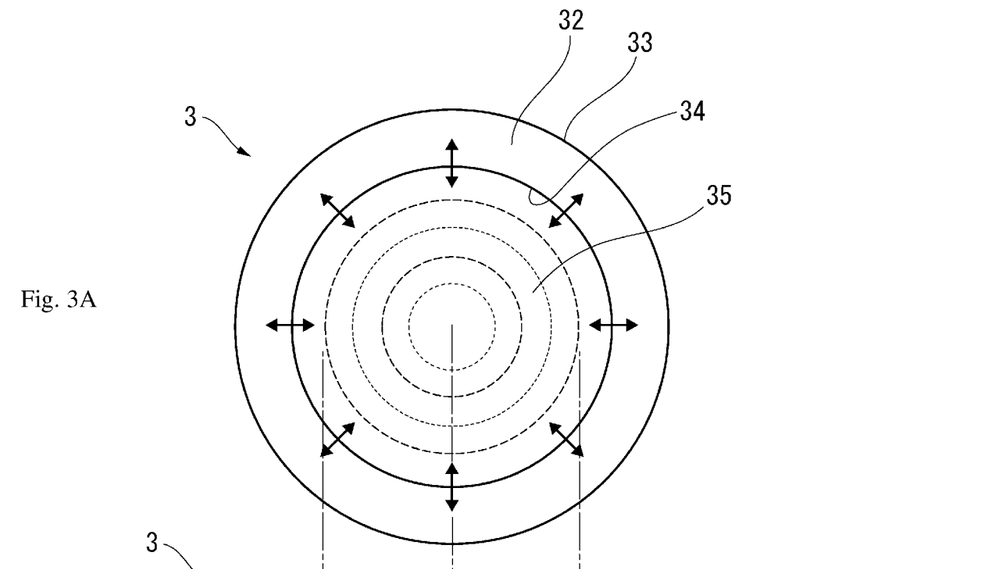
FIGS. 3A to 3C are schematic views illustrating oscillation states of the liquid lens system according to the embodiment.
Figure 3B:
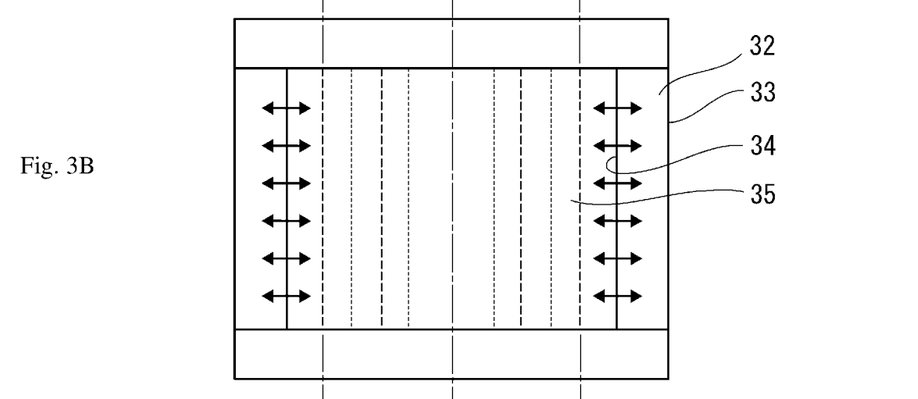
Figure 3C:
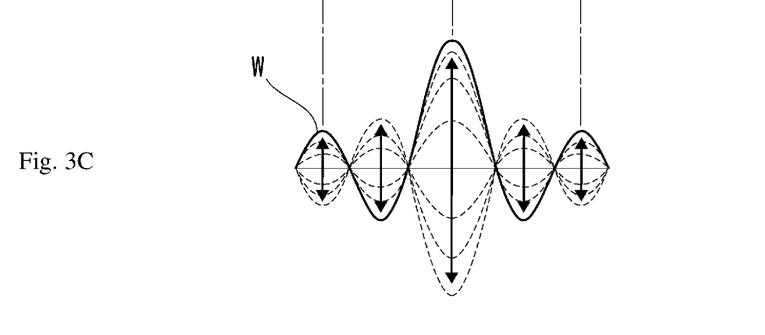
Figure 4A:
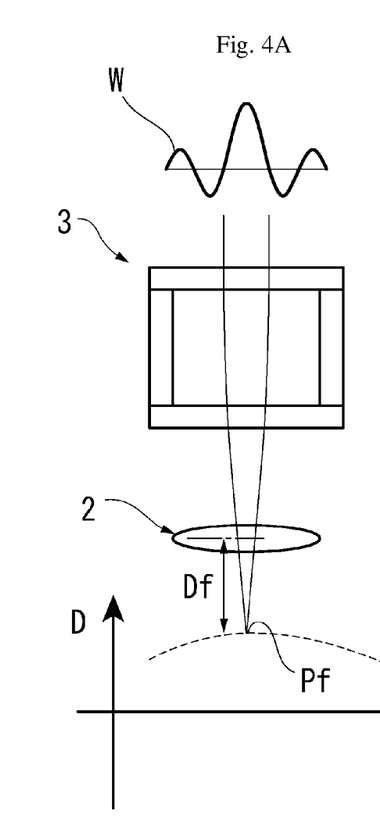
FIGS. 4A to 4E are schematic views illustrating a focal length of the liquid lens system according to the embodiment.
Figure 4B:
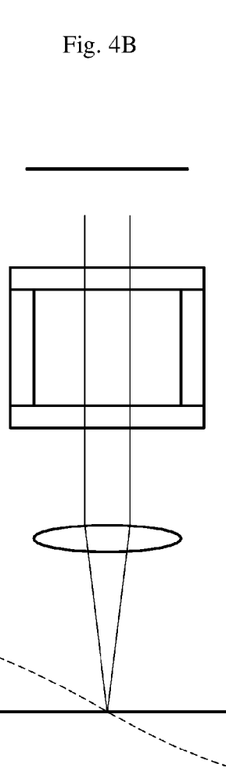
Figure 4C:
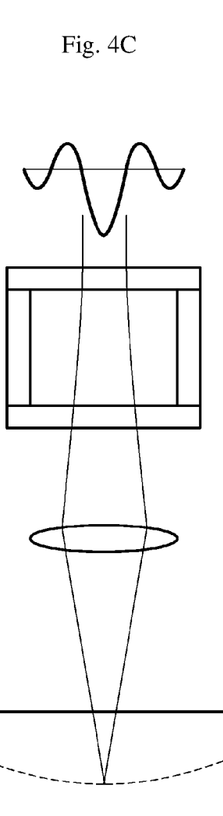
Figure 4D:
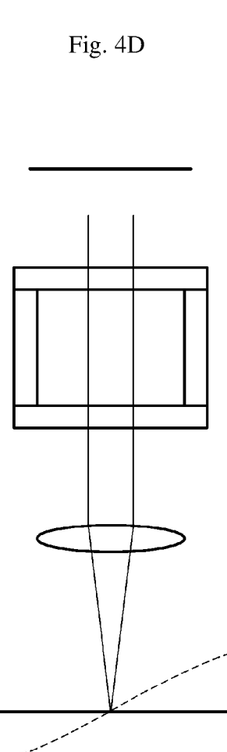
Figure 4E:
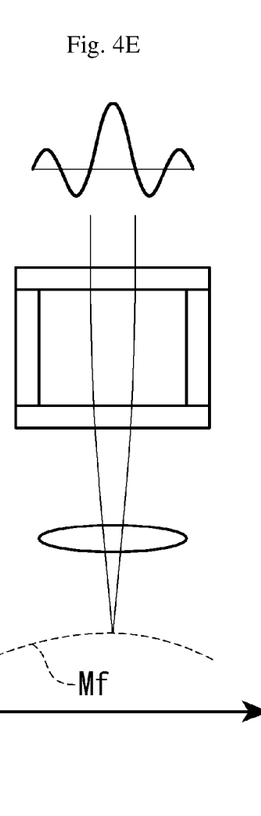

As shown in FIGS. 3A to 3C, in the liquid lens apparatus 3, when the oscillating member 32 is oscillated, a standing wave arises in the interior liquid 35 and concentric circular regions arise where the refractive index alternates (see FIGS. 3A and 3B). At this point, a relationship between a distance from a center axis line of the liquid lens apparatus 3 (radius) and the refractive index of the liquid 35 is as shown by a refractive index distribution W illustrated in FIG. 3C.

In FIGS. 4A to 4E, because the drive signal Cf is a sinusoidal AC signal, bands in the refractive index distribution W of the liquid 35 in the liquid lens apparatus 3 also change in accordance with the drive signal Cf. Also, the refractive index of the concentric circular regions that arise in the liquid 35 changes sinusoidally, and accordingly the focal length Df to the focal position Pf changes sinusoidally. In the state depicted in FIG. 4A, an amplitude of the refractive index distribution W is at its largest, the liquid lens apparatus 3 causes transiting light to converge, the focal position Pf is closer, and the focal length Df is at its shortest. In the state depicted in FIG. 4B, the refractive index distribution W is flat, the liquid lens apparatus 3 allows transiting light to transit unaffected, and the focal position Pf and the focal length Df are at standard values. In the state depicted in FIG. 4C, the amplitude of the refractive index distribution W is at its largest at the opposite pole from that of FIG. 4A, the liquid lens apparatus 3 causes transiting light to diffuse, the focal position Pf is farther, and the focal length Df is at its maximum. In the state depicted in FIG. 4D, once again the refractive index distribution W is flat, the liquid lens apparatus 3 allows transiting light to transit unaffected, and the focal position Pf and the focal length Df are at standard values. The state depicted in FIG. 4E returns once again to the state depicted in FIG. 4A and similar fluctuations are repeated thereafter.

In this way, in the variable focal length lens device 1, the drive signal Cf is a sinusoidal AC signal, and the focal position Pf and the focal length Df also fluctuate sinusoidally, as in a focal point fluctuation waveform Mf in FIGS. 4A to 4E. At this time, when pulse illumination is provided to the measured object 9 located at the focal position Pf at a desired point in time on the focal point fluctuation waveform Mf, and an image that is illuminated at that point in time is detected, an image is obtained of the focal position Pf at the focal length Df at the desired time of illumination.

Lens Controller 6

Figure 5:
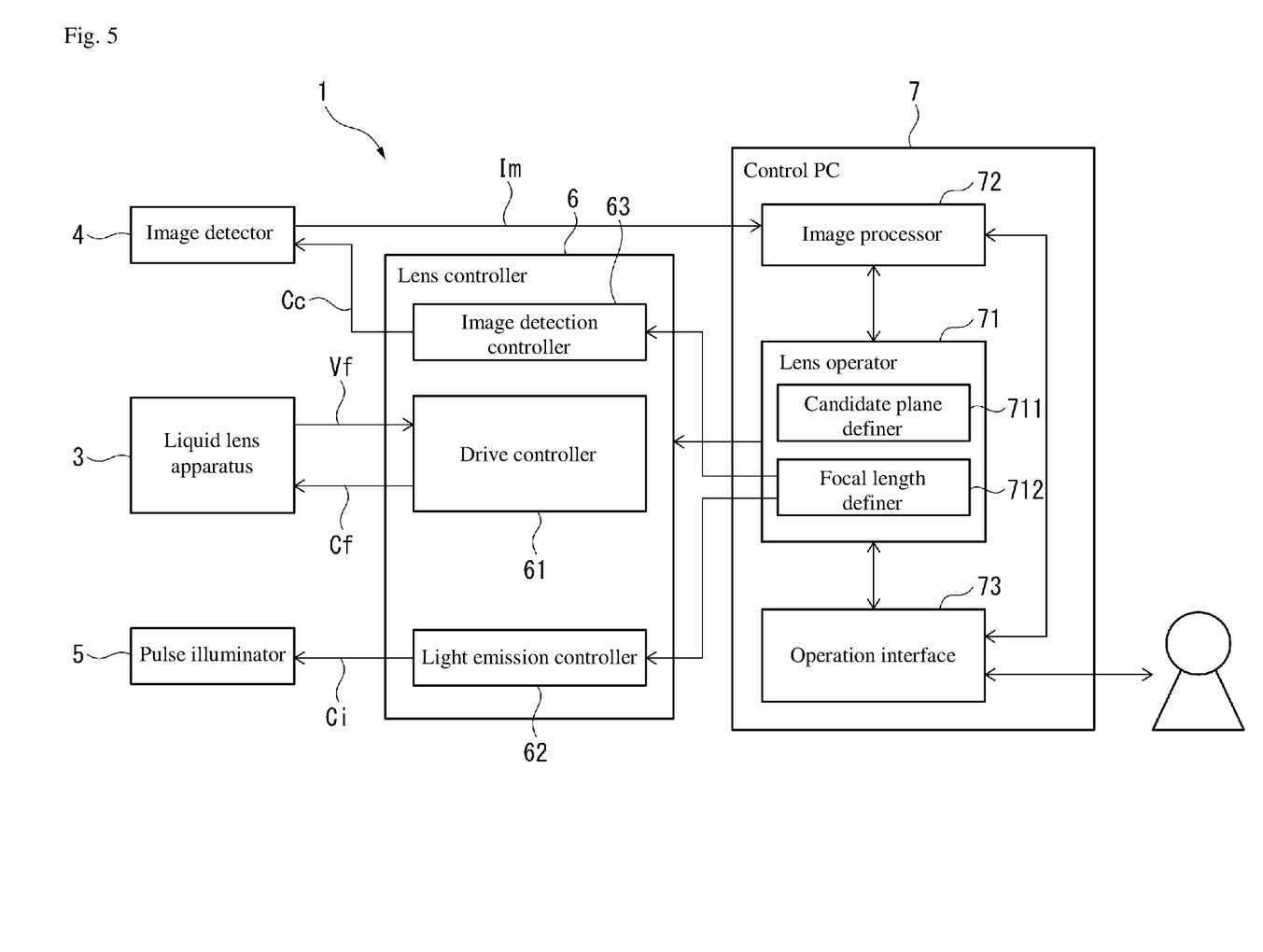
FIG. 5 is a block diagram illustrating control components according to the embodiment.

As illustrated in FIG. 5, in the variable focal length lens device 1, oscillation of the liquid lens apparatus 3, firing of the pulse illuminator 5, and image detection by the image detector 4 are controlled by the drive signal Cf, the light emission signal Ci, and an image detection signal Cc from the lens controller 6. At this time, an effective electric power, drive current, or the like applied to the liquid lens apparatus 3 is returned to the lens controller 6 as an oscillation state Vf of the liquid lens apparatus 3. The lens controller 6 includes a drive controller 61 that outputs the drive signal Cf to the liquid lens apparatus 3, a light emission controller 62 that outputs the light emission signal Ci to the pulse illuminator 5, and an image detection controller 63 that outputs the image detection signal Cc to the image detector 4. The control PC 7 is connected in order to manipulate settings of the lens controller 6, for example.

Control PC 7

The control PC 7 includes a lens operator 71 (lens operation processor) for performing operations such as establishing settings for the lens controller 6; an image processor 72 that imports and processes the detected image Im from the image detector 4; and an operation interface 73 that receives a user operation directed at the variable focal length lens apparatus 1. The lens operator 71 includes functionality that manipulates various settings for when the lens controller 6 controls the liquid lens apparatus 3, for example, and is also configured for automatic definition of a focal length that is responsive to the measured object 9, based on the present invention.

The lens operator 71 includes a candidate plane definer 711 and a focal length definer 712. The candidate plane definer 711 defines a plurality of candidate planes (Pi; see FIG. 8) at different focal lengths (Di; see FIG. 8) of the variable focal length lens device 1, and at each of the candidate planes Pi, the candidate plane definer 711 detects the detected image Im of the measured object 9 using the image detector 4 and calculates the contrast (CTi; see FIG. 8) in each detected image Im. The focal length definer 712 selects any of the candidate planes Pi based on the previously calculated contrast CTi, and defines for the lens controller 6 the focal length Di of the selected candidate plane Pi (phase θi at the drive signal Cf, which is the light emission signal Ci for the pulse illuminator 5).

Figure 6:
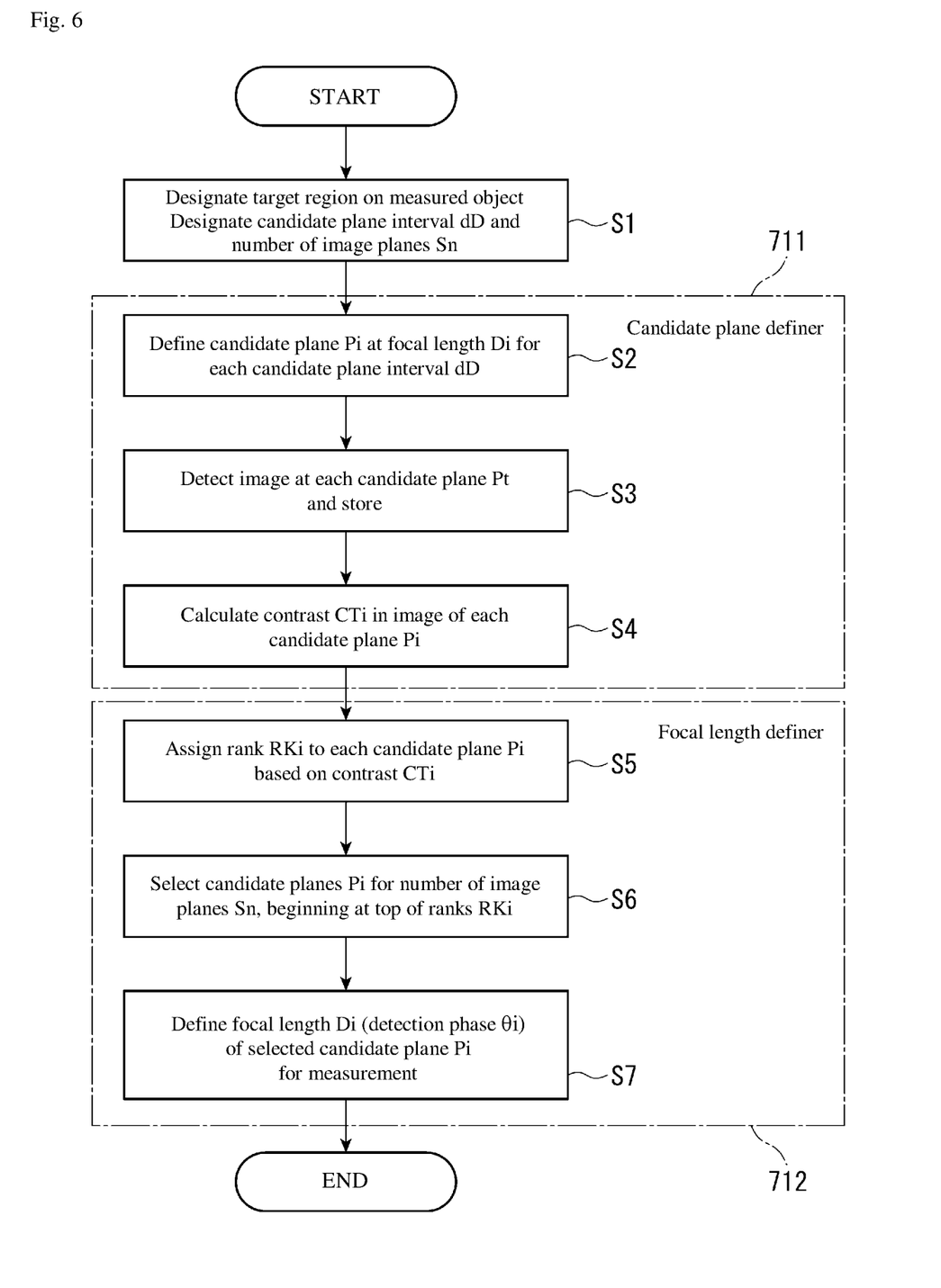
FIG. 6 is a flow chart illustrating a control protocol according to the embodiment.
Figure 7:
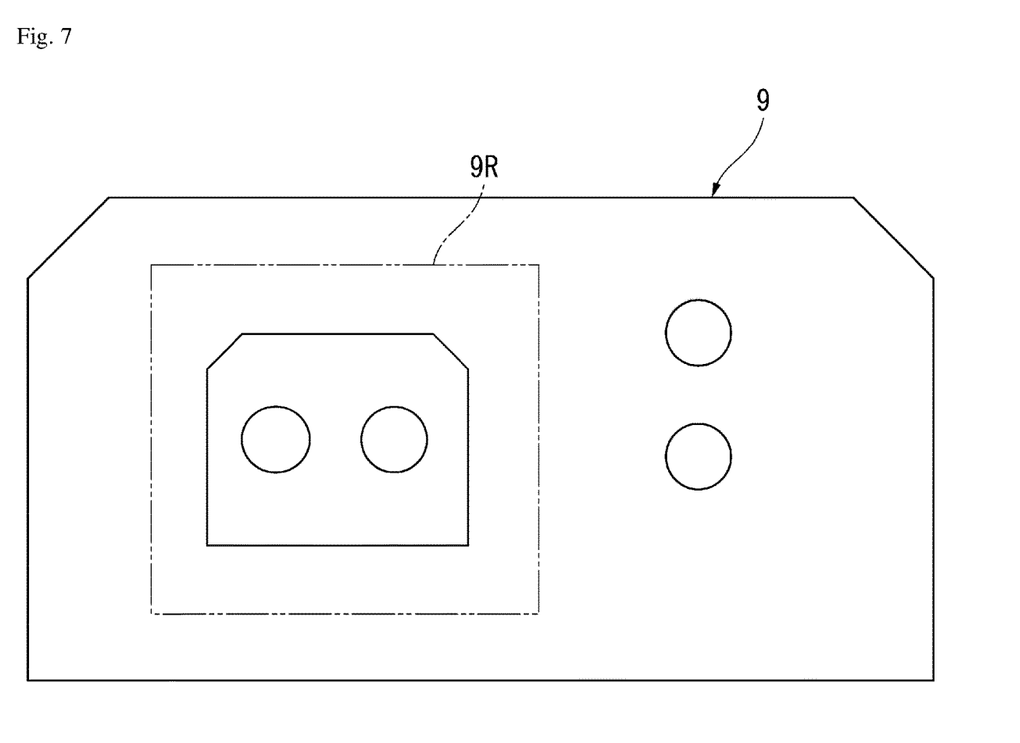
FIG. 7 is a schematic view illustrating an operation for defining a target region according to the embodiment.

FIG. 6 illustrates a concrete processing protocol that is executed by the lens operator 71 for automatically defining the focal length. When the lens operator 71 executes the automatic definition of the focal length, the user creates preliminary settings, designating a target region on the measured object 9 through the operation interface 73 and also designating a candidate plane interval dD and number of image planes Sn for the candidate plane Pi (process S1). As illustrated in FIG. 7, the target region can be designated by displaying the image of the measured object 9 imported from the image detector 4 on the operation interface 73 and surrounding a desired target region 9R with a frame tool, for example. When designating the entire measured object 9 as the target region 9R, the entire measured object 9 may be surrounded with the frame tool.

A region of interest on the measured object, such as a region where image measurement is to be performed, can be appropriately used as the target region 9R. The user may define the candidate plane interval dD in consideration of a shape or the like of the measured object 9. For example, when the measured object 9 has a simple shape with only three stepped surfaces, processing time can be compressed by setting the candidate plane interval dD to be large and setting the number of candidate planes Pi to be low. Also, when the measured object 9 has complex unevenness, the candidate plane interval dD is preferably set to be small and a large number of candidate planes Pi are preferably defined.

Returning to FIG. 6, based on the designated candidate plane interval dD, the candidate plane definer 711 distributes the focal length Di for each candidate plane interval dD within a focus range of the liquid lens apparatus 3 and defines the candidate plane Pi for each focal length Di (process S2). Next, for each of the defined candidate planes Pi, the candidate plane definer 711 detects and stores an image of the measured object 9 in a state where the image is focused on the candidate plane Pi (process S3). Then, the contrast CTi is calculated for the detected image of each candidate plane Pi (process S4).

Figure 8:
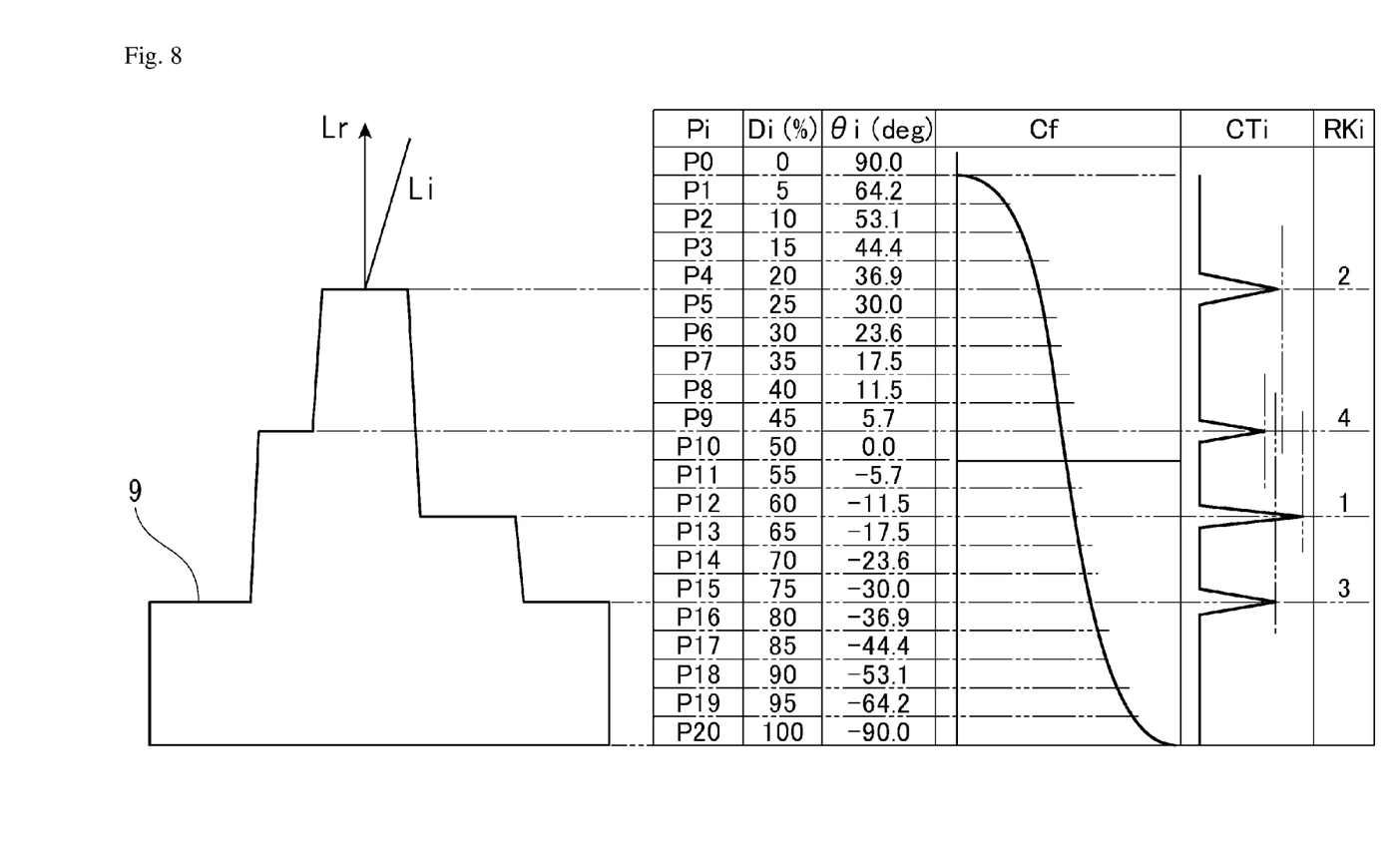
FIG. 8 is a schematic view illustrating control activity according to the embodiment.

As illustrated in FIG. 8, when the candidate plane interval dD is set to 5% of a variable focal length range of the variable focal length lens (the objective lens 2 and the liquid lens apparatus 3), 21 candidate planes Pi (candidate planes P0 to P20) are defined in the variable focal length range. The respective phase θi of the drive signal Cf corresponds to the candidate plane interval dD. The light emission signal Ci is output from the light emission controller 62 at the phase θi and causes the pulse illuminator 5 to emit light. This allows detection of an image in a state where the focal length is at the candidate plane Pi. When stepped surfaces of the measured object 9 are located at candidate planes P4, P9, P12, and P15, each surface is detected in an image in a focused state. In this example, when the contrast CTi of each of the candidate planes Pi is calculated, peaks appear at the contrasts CTi for the candidate planes P4, P9, P12, and P15.

Returning to FIG. 6, once data for a candidate plane Pi with contrast CTi is obtained through the processes S1 to S4 of the candidate plane definer 711, the focal length definer 712 selects the candidate plane Pi to be used in measuring the measured object 9. The focal length definer 712 attributes a rank RKi to each candidate plane Pi based on the contrast CTi (process S5). Then, beginning at the top of the ranks RKi, candidate planes Pi for the number of image planes Sn that was set in process S1 are selected (process S6). Furthermore, the focal length definer 712 defines the focal length Di (or detection phase θi) of the selected candidate planes Pi for the lens controller 6 (light emission controller 62 and image detection controller 63) (process S7).

FIG. 8 shows four peaks in the contrast CTi calculated for the candidate planes Pi, but in a case where the number of image planes Sn is two, for example, a first-ranked candidate plane P12 and a second-ranked candidate plane P4 in the ranks RKi are selected. Then, focal lengths D12 and D4 (or detection phases θ12 and θ4) corresponding to each are defined for the lens controller 6. In the lens controller 6, an image detection operation is performed based on the defined focal lengths D12 and D4 (or detection phases θ12 and θ4), which enables an image that is focused at the stepped surfaces of the measured object 9 to be obtained.

The following effects are achieved according to the present embodiment as described above. In the present embodiment, a plurality of candidate planes Pi having different focal lengths Di are defined within a focal range of the variable focal length lens (the objective lens 2 and the liquid lens apparatus 3), and image detection of the measured object 9 is performed at each candidate plane Pi. In addition, a selection is made based on the contrasts CTi of the detected images for the plurality of candidate planes Pi. This allows a candidate plane Pi that is in focus at the surface of the measured object 9 to be identified. Then, the focal length Di (or detection phase θi) of the identified candidate plane Pi can be defined for the lens controller 6. Accordingly, automatic definition of a focal length Di that is responsive to the measured object 9 can be performed without requiring cumbersome preparatory work by the user. In particular, when any one is selected from among the plurality of candidate planes Pi, the contrast CTi of each of the detected images is calculated, and then selection is made with-reference to the contrast CTi. Accordingly, a candidate plane Pi that is in focus at the surface of the measured object 9 can be selected reliably.

The present embodiment is configured such that the number of image planes Sn is designated ahead of time, and also the rank RKi is assigned to the candidate plane Pi based on the detected contrast CTi, and candidate planes Pi for the number of image planes Sn are selected beginning at the top of the ranks RKi. Therefore, so long as the number of image planes Sn is designated ahead of time, a candidate plane Pi that is at a focus position of the measured object 9 can be selected automatically based on the assigned rank, which is based on the contrast CTi, without further operation by the user.

The present embodiment is configured such that the candidate plane interval dD is designated ahead of time, and the candidate plane Pi is defined for each focal length Di for each candidate plane interval dD within a variable focal range of the variable focal length lens (the objective lens 2 and the liquid lens apparatus 3). Therefore, so long as the candidate plane interval dD is designated, the plurality of candidate planes Pi can be automatically distributed and defined within the variable focal range of the variable focal length lens, and a cumbersome operation in which the different focal lengths Di are individually designated as the candidate planes Pi can be eliminated.

The present embodiment is configured such that the target region 9R is designated ahead of time on a portion of the measured object 9, and definition of the candidate planes Pi through to calculation of the contrasts CTi is performed for the designated target region 9R. Therefore, a process from definition through selection of the candidate plane Pi can be sped up.

In the present embodiment, a combination of the liquid lens apparatus 3, in which the refractive index changes in response to an input drive signal, and the objective lens 2, which is disposed on the same optical axis as the liquid lens apparatus 3, is used as the variable focal length lens. Therefore, basic imaging can be achieved with the objective lens 2, and the focal length can be modified with the liquid lens apparatus 3. In particular, by using the liquid lens apparatus 3, no mechanism is needed for changing the focal length and the configuration of the device can be simplified. Also, the liquid lens apparatus 3 can change the focal length periodically and at high speed, and a multi-plane image that is focused on a plurality of focal planes can also be readily obtained.

Other Embodiments

The present invention is not limited to the embodiment described above, and includes modifications within a scope capable of achieving the advantages of the present invention. The embodiment above is configured such that the number of image planes Sn is designated ahead of time. The embodiment above is also configured such that the rank RKi is assigned to the candidate plane Pi based on the detected contrast CTi, and candidate planes Pi for the number of image planes Sn are selected automatically beginning at the top of the ranks RKi. In comparison, the plurality of candidate planes Pi for which the contrast CTi is calculated may, for example, be sorted in order of contrast CTi and displayed as a list on a screen, and the user may judge the contrast CTi of each candidate plane Pi and select any of the candidate planes. Also, instead of designating the number of image planes Sn, a reference value CTr for the contrast CTi may be designated and all of the candidate planes Pi for which the contrast CTi is equal to or greater than the reference value CTr may be selected.

The embodiment above is configured such that the candidate plane interval dD is designated ahead of time, and the candidate plane Pi is automatically distributed for each focal length Di for each candidate plane interval dD within the variable focal range of the variable focal length lens (the objective lens 2 and the liquid lens apparatus 3). In comparison, for example, a number Pn of candidate planes Pi may be designated and that number Pn of candidate planes Pi may be distributed equally within the variable focal range of the variable focal length lens, or the like.

The embodiment above is configured such that the target region 9R is designated ahead of time on a portion of the measured object 9, and definition of the candidate planes Pi through to calculation of the contrasts CTi is performed for the designated target region 9R. In comparison, the contrast CTi may be constantly calculated for the entire measured object 9, and the operation to designate the target region 9R can be eliminated. In the embodiment above, a combination of the liquid lens apparatus 3, in which the refractive index changes in response to an input drive signal, and the objective lens 2, which is disposed on the same optical axis as the liquid lens apparatus 3, is used as the variable focal length lens. In comparison, some other form of variable focal length lens may be used.

The present invention can be used in a variable focal length lens control method and a variable focal length lens device.

As illustrated in FIGS. 1 and 5, the control PC 7 may include at least one processor. The processor is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor is an article of manufacture and/or a machine component. The processor is configured to execute software instructions in order to perform functions as described in the various embodiments herein. For example, the processor is configured to execute instructions such that the processor includes a lens operation processor that operates as a candidate plane definer that defines a plurality of candidate planes at different focal lengths of the variable focal length lens, detects an image of the measurable object with the image detector at each of the candidate planes, and calculates contrast in each of the detected images, and a focal length definer that selects any of the candidate planes based on the contrast, and defines for the lens controller a focal length of the selected candidate plane.

The processor may be a general purpose processor or may be part of an application specific integrated circuit (ASIC). The processor may also be a microprocessor, a microcomputer, a processor chip, a controller, a microcontroller, a digital signal processor (DSP), a state machine, or a programmable logic device. The processor may also be a logical circuit, including a programmable gate array (PGA) such as a field programmable gate array (FPGA), or another type of circuit that includes discrete gate and/or transistor logic. The processor may be a central processing unit (CPU), a graphics processing unit (GPU), or both. Additionally, any processor described herein may include multiple processors, parallel processors, or both. Multiple processors may be included in, or coupled to, a single device or multiple devices.

The control PC 7 may also include one or more computer memories. The computer memory may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory may include any combination of memories or a single storage.

The control PC 7 may also include a medium reader which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory, the medium reader, and/or the processor during execution by the control PC 7.

The control PC 7 is shown in FIGS. 1 and 5 as a personal computer. However, those skilled in the art appreciate that, in alternative embodiments of the present application, the control PC 7 may be a laptop computer, a tablet PC, a personal digital assistant, a mobile device, a palmtop computer, a desktop computer, a communications device, a wireless telephone, a personal trusted device, a web appliance, a server, a security camera, or any other device that is capable of executing a set of instructions, sequential or otherwise, that specify actions to be taken by that device. Of course, those skilled in the art appreciate that the above-listed devices are merely exemplary devices and that the control PC 7 may be any additional device or apparatus commonly known and understood in the art without departing from the scope of the present application. Furthermore, those skilled in the art similarly understand that the device may be any combination of devices and apparatuses.

Of course, those skilled in the art appreciate that the above-listed components of the control PC 7 are merely meant to be exemplary and are not intended to be exhaustive and/or inclusive. Furthermore, the examples of the components listed above are also meant to be exemplary and similarly are not meant to be exhaustive and/or inclusive.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A variable focal length lens control method making use of a variable focal length lens device that includes a variable focal length lens capable of modifying a focal length, an image detector capable of detecting an image of a measurable object through the variable focal length lens, a lens controller that causes the image detector to detect an image when the variable focal length lens is at a predetermined focal length, and a lens operation processor that performs operations including establishing settings for the lens controller, the method comprising:

defining, via the lens operation processor, a plurality of candidate planes at different focal lengths of the variable focal length lens;
detecting, via the lens operation processor, an image of the measurable object by the image detector at each of the candidate planes;
calculating contrast in each of the detected images;
selecting, via the lens operation processor, any of the candidate planes based on the contrast; and
defining, via the lens operation processor, a focal length of the selected candidate plane is defined for the lens controller.

2. The variable focal length lens control method according to claim 1, further comprising:
designating a number of image planes ahead of time;
assigning ranks to the candidate planes based on the calculated contrast; and
selecting candidate planes for the number of image planes beginning at the top of the ranks.

3. The variable focal length lens control method according to claim 1, further comprising:
designating a candidate plane interval ahead of time; and
defining the candidate plane for each focal length for each candidate plane interval within a variable focal range of the variable focal length lens.

4. The variable focal length lens control method according to claim 2, further comprising:
designating a candidate plane interval ahead of time; and
defining the candidate plane for each focal length for each candidate plane interval within a variable focal range of the variable focal length lens.

5. The variable focal length lens control method according to claim 1, further comprising:
designating a target region ahead of time on a portion of the measurable object; and
performing definition of the candidate planes through to calculation of the contrasts for the target region.

6. The variable focal length lens control method according to claim 2, further comprising:
designating a target region ahead of time on a portion of the measurable object; and
performing definition of the candidate planes through to calculation of the contrasts for the target region.

7. The variable focal length lens control method according to claim 3, further comprising:
designating a target region ahead of time on a portion of the measurable object; and
performing definition of the candidate planes through to calculation of the contrasts for the target region.

8. The variable focal length lens control method according to claim 4, further comprising:
designating a target region ahead of time on a portion of the measurable object; and
performing definition of the candidate planes through to calculation of the contrasts for the target region.

9. The variable focal length lens control method according to claim 1, wherein the variable focal length lens includes a liquid lens system, in which the refractive index changes in response to an input drive signal, and an objective lens, which is disposed on the same optical axis as the liquid lens system.

10. The variable focal length lens control method according to claim 2, wherein the variable focal length lens includes a liquid lens system, in which the refractive index changes in response to an input drive signal, and an objective lens, which is disposed on the same optical axis as the liquid lens system.

11. The variable focal length lens control method according to claim 3, wherein the variable focal length lens includes a liquid lens system, in which the refractive index changes in response to an input drive signal, and an objective lens, which is disposed on the same optical axis as the liquid lens system.

12. The variable focal length lens control method according to claim 4, wherein the variable focal length lens includes a liquid lens system, in which the refractive index changes in response to an input drive signal, and an objective lens, which is disposed on the same optical axis as the liquid lens system.

13. The variable focal length lens control method according to claim 5, wherein the variable focal length lens includes a liquid lens system, in which the refractive index changes in response to an input drive signal, and an objective lens, which is disposed on the same optical axis as the liquid lens system.

14. The variable focal length lens control method according to claim 6, wherein the variable focal length lens includes a liquid lens system, in which the refractive index changes in response to an input drive signal, and an objective lens, which is disposed on the same optical axis as the liquid lens system.

15. The variable focal length lens control method according to claim 7, wherein the variable focal length lens includes a liquid lens system, in which the refractive index changes in response to an input drive signal, and an objective lens, which is disposed on the same optical axis as the liquid lens system.

16. The variable focal length lens control method according to claim 8, wherein the variable focal length lens includes a liquid lens system, in which the refractive index changes in response to an input drive signal, and an objective lens, which is disposed on the same optical axis as the liquid lens system.

17. A variable focal length lens device comprising:
a variable focal length lens capable of modifying a focal length;
an image detector capable of detecting an image of a measurable object through the variable focal length lens;
a lens control processor that causes the image detector to detect an image when the variable focal length lens is at a predetermined focal length; and
a lens operation processor that defines for the lens controller a focal length where the image detector detects the image, the lens operation processor comprising:
one or more memories that store a set of executable instructions such that the lens operation processor, when executing the set of executable instructions, is configured to operate as:
a candidate plane definer that defines a plurality of candidate planes at different focal lengths of the variable focal length lens, and that detects an image of the measurable object with the image detector at each of the candidate planes, such that contrast in each of the detected images is calculated; and
a focal length definer that selects any of the candidate planes based on the contrast, and defines for the lens controller a focal length of the selected candidate plane.

* * * * *